P. T. SNYDER.
PUMP.
APPLICATION FILED FEB. 14, 1912.
1,085,949.
Patented Feb. 3, 1914.
3 SHEETS—SHEET 1.
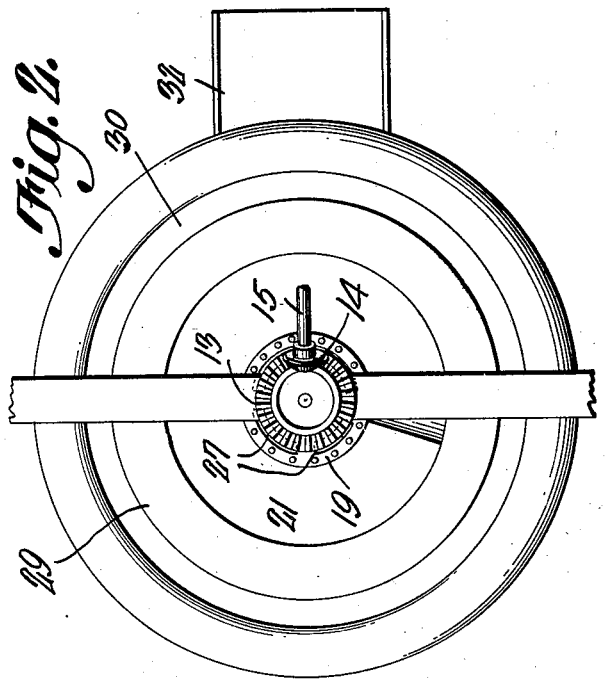
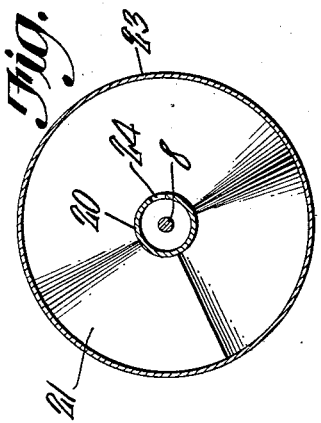
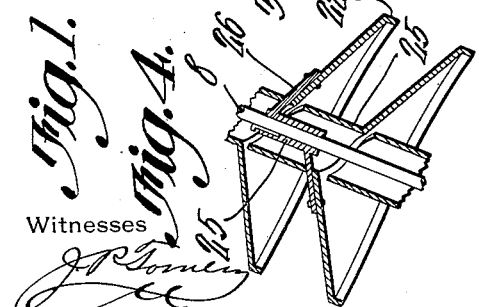
Witnesses
Parke T. Snyder Inventor
by
Attorneys

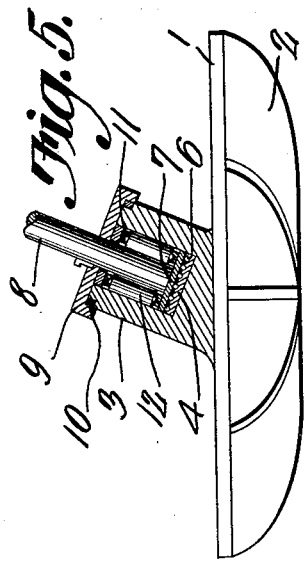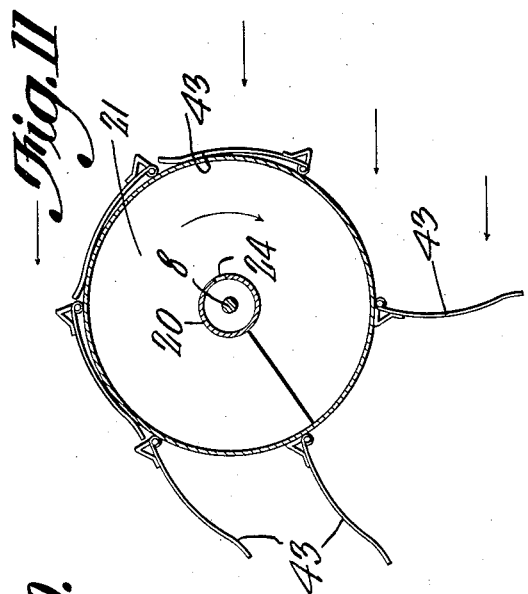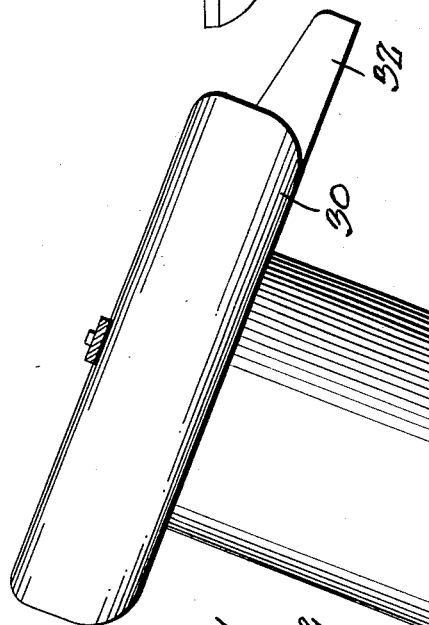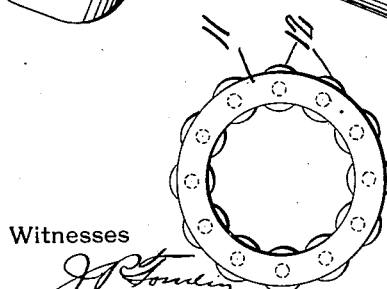

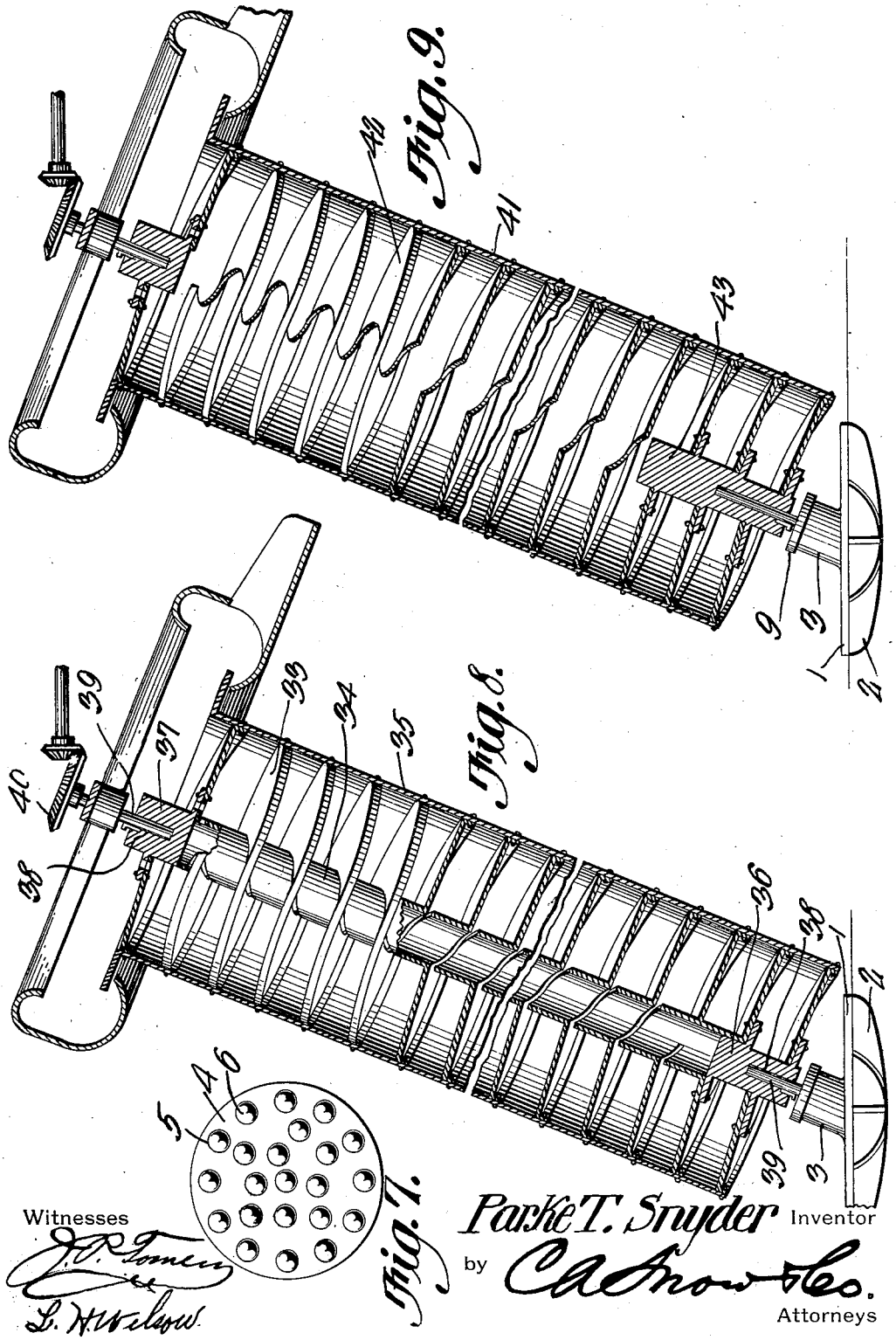

UNITED STATES PATENT OFFICE.

PARKE T. SNYDER, OF CHICAGO, ILLINOIS, ASSIGNOR TO R. J. BEATTY, TRUSTEE, OF CHICAGO, ILLINOIS.

PUMP.

1,085,949. Specification of Letters Patent. Patented Feb. 3, 1914.

Application filed February 14, 1912. Serial No. 677,416.

*To all whom it may concern:*

Be it known that I, PARKE T. SNYDER, a citizen of the United States, residing at Chicago, in the county of Cook and State of Illinois, have invented a new and useful Pump, of which the following is a specification.

This invention relates to pumps or water hoists of the Archimedean type and it has for its object the provision of means whereby the air spaces above the bodies of water supported by the various convolutions of the screw of the hoist will be constantly in communication with the external atmosphere, thereby preventing gravitation of the contents of the hoist to the level of the supply.

A further object is to provide improved means for maintaining communication with the external atmosphere, said means being such as positively to prevent clogging and, consequently, improper or inefficient action of the hoist.

Water hoists of this type such as heretofore constructed have employed minute openings connecting a central air space with the spaces between the convolutions in order that siphonic action or return flow of the elevated water might be prevented but it has been found, in using such devices, that trash, such as leaves, twigs, and other foreign substances have been carried into the inaccessible portions of the hoist by the water and have clogged the air openings, thereby preventing the escape of air to or from the external atmosphere and, therefore, preventing the proper operation of the apparatus. As hereinbefore stated, one of the principal objects of this invention is to provide means whereby this objectionable clogging of the air vents is prevented.

A further object is to provide means at the lower end of the screw for checking the down flow of fluid within the hoist whereby fluid, after once entering the hoist, can only escape by passing upwardly through the outlet at the upper end thereof. Furthermore this check, by acting as a water retaining means, prevents the screw from reversing under the action of the water supported thereby, when power is disconnected from the screw.

Another object is to provide a water hoist which is simple and durable in construction and the parts of which can be assembled readily.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

In said drawings:—Figure 1 is a vertical section through a pump or water hoist embodying the present improvements, a portion of the screw being shown in elevation. Fig. 2 is a view of the upper end of the apparatus. Fig. 3 is a transverse section through the casing and screw of the hoist. Fig. 4 is a section through a portion of the hoist and showing an intermediate brace. Fig. 5 is an enlarged section through the lower bearing of the hoist. Fig. 6 is an end view of the roller carrying portion of said bearing. Fig. 7 is a plan view of the ball holding plate of the bearing. Fig. 8 is a section similar to Fig. 1 and showing a modified form of the invention. Fig. 9 is a similar view showing another modified form. Fig. 10 is a side elevation of the apparatus and showing modified means for propelling the same. Fig. 11 is a cross section through the form shown in Fig. 10 and showing the feathering blades.

Referring to the figures by characters of reference 1 designates a base preferably in the form of a plate having fins 2 radially disposed on the bottom face thereof and which can be anchored in a concrete bed or the like. A tubular casing 3 extends upwardly from the plate and is preferably inclined at approximately 45 degrees, this casing having a plate 4 therein and within which are formed a number of recesses 5 adapted to hold anti-friction balls such as indicated at 6. These balls support a bearing plate or head 7 formed at the lower end of a shaft 8 and a cap 9 is keyed or otherwise secured to the shaft 8 and serves to close the upper end of the casing 3. A ring 10 extends around the upper end of the casing and is inclosed by the cap, this ring serving as a means for preventing the admission of sand, etc., to the interior of the casing 3.

A cage 11 is mounted within the casing 3 and carries a series of anti-friction rollers 12, these rollers being interposed between the shaft 8 and the wall of the casing 3 and serving to reduce friction to the minimum.

In the form of apparatus shown in Fig. 1, the shaft 8 extends throughout the length of the hoisting apparatus and is provided, at its upper end, with a gear 13 adapted to receive motion, through a gear 14, from a propelling shaft 15 which may be operated by any suitable type of motor, not shown. It is of course to be understood that the upper end portion of the shaft is mounted with any suitable form of bearing and this bearing is to be held fixed by any desired form of supporting structure. It has not been deemed necessary to illustrate, in detail, the bearing in which the upper end of the shaft 8 is located.

Keyed or otherwise secured to the shaft 8 close to the casing 3 is a sleeve 16 having a spiral flange 17 outstanding therefrom and inclined downwardly relative to the longitudinal axis of the sleeve. Another sleeve 18 is keyed or otherwise secured to the upper end portion of shaft 8 and this sleeve is likewise provided with a spiral flange 19 inclined downwardly relative to the longitudinal axis of the sleeve.

The two sleeves 16 and 18 are located at the ends of a tubular core 20. This core extends through the center of a hoisting screw 21 each convolution of which has its upper face inclined upwardly toward the core. The two lower convolutions of the screw are riveted or otherwise secured upon the spiral rib or flange 17 formed on the lower sleeve 16, while the upper convolution of the screw extends under and is riveted or otherwise secured to the spiral rib or flange 19 on the upper sleeve 18. The end convolutions of the screw are preferably of thicker material than the intermediate convolutions, as will be apparent by referring to Fig. 1 and all of the convolutions are provided with depending flanges 22 at the outer edges thereof and which are adapted to be riveted or otherwise secured to the inner face of a cylindrical casing 23 which is concentric with the shaft 8. Any suitable means may be employed for rendering water-tight the connection between the flanges 22 and the casing 23.

A slot 24 is formed in the core 20 along the lower faces of those convolutions above the sleeve 16 and thus extends spirally within the core from the lower end of sleeve 18 to the upper end of sleeve 16.

For the purpose of reinforcing the screw at one or more intermediate points, one or more braces are mounted on the shaft 8. Each of these braces, as shown in Fig. 4, consists of a sleeve 25 keyed or otherwise secured to the shaft and having a spiral flange or rib 26 outstanding therefrom and riveted or otherwise secured to the adjacent convolutions of the screw 21. This rib or flange extends through the core so as to properly engage the flange and the convolution engaged by this rib is of greater thickness than the other intermediate convolutions. A series of openings 27 extends through the spiral flange 19 and also through the adjacent portions of the upper convolution of the screw 21, these openings constituting the vents for the escape of air from under the upper convolution to the external atmosphere. Hingedly connected to the end of the lower convolution of screw 21 is a gate or check valve 28 extending from the sleeve 16 to the casing 23 and adapted, when closed, to bear against the lower face of the next adjoining convolution thereabove. This gate is adapted to open automatically when subjected to the pressure of water entering the lower end of the spiral passage formed between the convolutions of the screw. The gate or valve will, however, close automatically each time it is relieved of the force of the inrushing water, this closing action being produced by the pressure against the valve of the contents of the hoist.

An annular flange 29 is preferably formed at the upper end of casing 23 and projects into a substantially circular trough 30 overhung by an inverted gutter. This trough may be provided, at its lowermost portion, with an outlet spout 32 or any other suitable means for conveying elevated water to the point of use.

It is to be understood that the water hoist constituting the present invention is to be tilted preferably at an angle of 45 degrees although, with the form hereinbefore described, water can be hoisted while the apparatus is held vertically. It has been found, however, that the greatest efficiency can be obtained by supporting the hoist at the angle stated. The lower end portion of the hoist is to be partly or entirely submerged and, when the casing 23 and the screw 21 are rotated by means of the power provided for that purpose, the lower end convolution of the screw will engage a portion of the water and gradually elevate it within the spiral passage formed between the convolutions, the space above each convolution being thus ultimately filled with water up to the level of the highest portion of the convolution on which the water is supported. An air pocket is thus produced above the water at each level within the hoist and this pocket communicates, through the spiral vent 24, with the interior of the core 20 and, through the openings 27, with the external atmosphere. Thus it will be seen that the atmospheric pressure upon each body of water contained within the hoist is maintained. Furthermore any trash or dust, leaves, weeds or the like, carried upwardly within the hoist by the water, cannot clog the vent 24 and thus interfere with the proper circulation of air. This is an important feature for the reason that, should the vent become clogged, it would be practically impossible to clear it because of its inaccessible position and, unless it should be cleared, a siphonic action of the contents of the hoist would take place and all of said contents would tend to flow down toward the lower end of the hoist and escape back to its original level, either along the upper faces of the convolutions or through the unchoked portions of the vent 24.

As heretofore stated the valve 28 opens automatically during the passage of water into the lower end of the spiral passage and, as soon as the rotation of casing 23 and screw 21 ceases, the water contained within the hoist will flow back a slight extent along the screw 21, thereby pushing against the valve 28 and closing it automatically so as to check further downward movement of the contents.

As the water is elevated by the hoist it flows from the upper end of the spiral passage intermittently and is discharged into the trough 30 from which it can flow through the outlet 32 to the point of use.

A feature of especial importance in the present device is the arrangement of upstanding tubes upon the convolutions of the screw 21. By means of these tubes, the capacity of each pocket formed above the convolutions of the screw is practically doubled. Heretofore, in order to use a water hoist of this type, it has been necessary to so pitch it in order to obtain water holding pockets of sufficient depth within the hoist, as to require a hoist of considerable length in order to raise water a comparatively slight distance. By placing the tubes as shown in the present structure, however, a greatly increased capacity is produced without the necessity of tilting the hoist to an objectionable extent. Furthermore these tubes form a spiral slot along the lower faces of the convolutions as hereinbefore described. This is advantageous for the reason that, as the hoist is designed primarily for draining marsh lands, more or less trash will be carried into the apparatus and there is no danger of this trash clogging the slot and interfering with the admission of air to the pockets between the convolutions. Attention is also directed to the check valve at the lower end of the structure and which serves to close the space between the two bottom convolutions of the screw. By means of this check valve water, after once entering the casing, cannot flow downwardly and there is thus no danger of the apparatus rotating in a reverse direction when power is removed therefrom, and becoming completely drained of its contents. As a result, the structure remains primed under all conditions and as soon as it is set in motion water begins to discharge from its upper end. Unless a check valve is thus employed, considerable time would be lost in again priming the apparatus.

Instead of having the convolutions of the screw inclined relative to the core 20 as shown in Fig. 1, the radii of the screw can be extended perpendicularly to the axis of rotation of the screw as indicated in Fig. 8 wherein the convolutions have been indicated at 33, the core at 34, and the casing at 35. In this modified form of the invention a shaft is not shown extending entirely through the core but, instead, the end sleeves 36 and 37, which correspond with the sleeves 16 and 18, are provided with sockets 38 in which are secured stub-shafts 39. One of these shafts extends downwardly into the bearing casing 3 while the other shaft extends upwardly and has a gear 40 secured thereto and which corresponds with the gear 13 hereinbefore referred to.

In Fig. 9 the hoist has been shown as made up solely of a cylindrical casing 41 having a spirally arranged blade 42 therein forming the hoisting screw. In this form of device the core is eliminated and the pockets formed between the upper portion of each convolution and the adjacent portion of the casing 41 constitutes the means for holding one of the bodies of water being elevated.

Any suitable means other than a motor may be provided for driving the pump or hoist. In Figs. 10 and 11 the casing has been shown provided, at its lower end, with feathering blades 43 whereby the force of the current of water in which the lower end of the hoist is submerged can be utilized for rotating the casing and the screw therein. Any desired number of these feathering blades can be utilized, it being understood that they will open out to receive the force of the current while moving in the same direction thereof but will fold inwardly against the casing while moving against the current.

A water hoist or pump such as herein described has been found particularly desirable for use in irrigating land and in reclaiming swamps and is advantageous because of the small power required to operate it, and because of its large capacity.

It will be understood that by using the central core within the hoist the capacity of the apparatus is considerably increased as compared with that form illustrated in Fig. 9 and in which no core is used.

In that form of the apparatus shown in Fig. 8, it will be noted that the intermediate convolutions of the screw are formed of thicker material than are the remaining convolutions, excepting those at the ends of the screw. Thus the apparatus is reinforced at its center. The same is likewise true of the structure shown in Fig. 9. In the last mentioned structure, the openings at the center of the lower convolutions are completely closed by the socketed members 43 from which the lower stub shaft extends.

What is claimed is:

1. A water hoist including an Archimedean screw and means at the inlet end of the screw for automatically checking the downflow of the contents of the screw.

2. A water hoist including an Archimedean screw and a check valve at the inlet end of the screw.

3. A water hoist including an Archimedean screw, means for rotating the screw, and a check valve at the inlet end of the screw.

4. A water hoist including an Archimedean screw, having a central longitudinal air passage in communication with the external atmosphere, there being a continuous vent close to the lower faces of the convolutions of the screw and for maintaining communication between said air passage and the spiral passage between the convolutions, and a check valve at the inlet end of the spiral passage.

5. A water hoist including an Archimedean screw having a central longitudinal air passage in constant communication with the external atmosphere, there being a spiral vent close to the lower faces of the convolutions of the screw and extending continuously from the upper portion of the passage for maintaining communication between said passage and the spiral passage between the convolutions, the lower portion of said spiral passage extending below the vent, and a check valve at the inlet end of the spiral passage.

6. A water hoist including a tubular core, a screw extending therearound, a casing surrounding the screw and concentric with the core, said screw and casing forming a spiral passage, and a spiral vent within the core and close to the lower face of each convolution of the screw.

7. A water hoist including a tubular core, a screw extending therearound, a casing surrounding the screw and concentric with the core, said screw and casing forming a spiral passage, a spiral vent within the core and close to the lower face of each convolution of the screw, and a check valve at the inlet end of the spiral passage.

8. A water hoist including a tubular core, a screw extending therearound and having its radii inclined upwardly toward the core, a casing surrounding the screw and concentric with the core, said screw and casing forming a spiral passage, and a spiral vent within the core and close to the lower face of each convolution of the screw.

9. A water hoist including a casing mounted for rotation, a screw secured within and revoluble with the casing and having an axial opening extending to a point removed from the lower end thereof, a shaft extending through said axial opening, and spiral reinforcing means mounted on the shaft and connected to intermediate convolutions of the screw.

10. A water hoist including a casing, a screw secured therein and revoluble therewith, said screw having an axial opening, members extending into the end convolutions of the screw and having spiral outstanding portions connected to said convolutions, and bearing devices extending from said members.

11. A water hoist including a casing mounted for rotation, a screw therein and revoluble therewith, said screw having an axial opening, members extending into end convolutions and closing the ends of said axial opening, each of said members having an outstanding spiral portion secured to the adjacent convolution, there being means for maintaining communication between said axial opening and the spaces between the convolutions of the screw, and opening within the upper convolution and the outstanding portion secured thereto.

In testimony that I claim the foregoing as my own, I have hereto affixed my signature in the presence of two witnesses.

PARKE T. SNYDER.

Witnesses:
 SELINA WILLSON,
 JAS. P. CAMPBELL.

---

Copies of this patent may be obtained for five cents each, by addressing the "Commissioner of Patents, Washington, D. C."